United States Patent
Iwami et al.

(10) Patent No.: US 9,893,571 B2
(45) Date of Patent: Feb. 13, 2018

(54) PERMANENT MAGNET TYPE ELECTRIC ROTATING MACHINE HAVING MAIN MAGNETS AND AUXILIARY MAGNETS, AND MANUFACTURING METHOD THEREOF

(75) Inventors: Taizo Iwami, Chiyoda-ku (JP); Sachiko Kawasaki, Chiyoda-ku (JP); Hiroe Fukuzumi, Chiyoda-ku (JP); Yoshinori Miyamoto, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 480 days.

(21) Appl. No.: 14/114,846

(22) PCT Filed: Jul. 8, 2011

(86) PCT No.: PCT/JP2011/065680
§ 371 (c)(1),
(2), (4) Date: Oct. 30, 2013

(87) PCT Pub. No.: WO2013/008284
PCT Pub. Date: Jan. 17, 2013

(65) Prior Publication Data
US 2014/0084731 A1 Mar. 27, 2014

(51) Int. Cl.
*H02K 1/27* (2006.01)
*H02K 1/02* (2006.01)
*H02K 15/03* (2006.01)

(52) U.S. Cl.
CPC ............... *H02K 1/02* (2013.01); *H02K 1/278* (2013.01); *H02K 15/03* (2013.01)

(58) Field of Classification Search
CPC .......... H02K 1/27; H02K 1/272; H02K 1/274; H02K 1/2753; H02K 1/278; H02K 15/02; H02K 15/03
(Continued)

(56) References Cited

U.S. PATENT DOCUMENTS

| | | | |
|---|---|---|---|
| 2002/0180294 A1 | 12/2002 | Kaneda et al. | |
| 2003/0094873 A1* | 5/2003 | Kim | H02K 1/278 |
| | | | 310/156.43 |

(Continued)

FOREIGN PATENT DOCUMENTS

| | | |
|---|---|---|
| JP | 2001-298887 A | 10/2001 |
| JP | 2002-354721 A | 12/2002 |

(Continued)

OTHER PUBLICATIONS

Machine translation of JP 2010130818 A (Jun. 2010).*

(Continued)

*Primary Examiner* — Michael Andrews
(74) *Attorney, Agent, or Firm* — Buchanan Ingersoll & Rooney PC (57) ABSTRACT

In a permanent magnet type electric rotating machine, a rotor is arranged in a Halbach array, a main magnet magnetized in the radial direction is formed of a rare-earth magnet and an auxiliary magnet magnetized in the circumferential direction is formed of a ferrite magnet, and a gap is provided between the main magnet and the auxiliary magnet; as a result, the quantity of utilized rare-earth magnets is reduced without the output torque of the electric rotating machine being decreased.

9 Claims, 5 Drawing Sheets

(58) Field of Classification Search
USPC ............ 310/156.07, 156.08, 156.21, 156.23,
310/156.36, 156.37, 156.43, 266; 29/596,
29/598
See application file for complete search history.

(56) References Cited

U.S. PATENT DOCUMENTS

| | | | |
|---|---|---|---|
| 2005/0040721 | A1 | 2/2005 | Kusase et al. |
| 2011/0012440 | A1* | 1/2011 | Toyota ................. H02K 1/2786 310/152 |

FOREIGN PATENT DOCUMENTS

| | | | | | |
|---|---|---|---|---|---|
| JP | 2004-350427 | A | | 12/2004 | |
| JP | 2005-45984 | A | | 2/2005 | |
| JP | 2005045984 | A | * | 2/2005 | ............... H02K 1/27 |
| JP | 2006-246570 | A | | 9/2006 | |
| JP | 2007-14110 | A | | 1/2007 | |
| JP | 2007-19127 | A | | 1/2007 | |
| JP | 2007019127 | A | * | 1/2007 | ............. H02K 41/03 |
| JP | 2010-63201 | A | | 3/2010 | |
| JP | 2010-130818 | A | | 6/2010 | |
| JP | 2010130819 | A | * | 6/2010 | ............. H02K 15/03 |

OTHER PUBLICATIONS

Machine translation of JP 2007019127 A (Jan. 2007).*
Machine translation of JP 2005045984 A (Feb. 2005).*
International Search Report (PCT/ISA/210) dated Oct. 11, 2011, by the Japanese Patent Office as the International Searching Authority for International Application No. PCT/JP2011/065680.
Office Action (Reason) dated Apr. 30, 2014, by the Japan Patent Office in corresponding Japanese Patent Application No. 2013-523715, and an English Translation of the Office Action. (7 pages).
Japanese Office Action dated Dec. 2, 2014 issued in corresponding Japanese Patent Appln. No. 2013-523715 with English translation (7 pages).

* cited by examiner

PERMANENT MAGNET TYPE ELECTRIC ROTATING MACHINE HAVING MAIN MAGNETS AND AUXILIARY MAGNETS, AND MANUFACTURING METHOD THEREOF

TECHNICAL FIELD

The present invention relates to a permanent magnet type electric rotating machine utilizing permanent magnets and a manufacturing method thereof.

BACKGROUND ART

In an electric rotating machine utilizing permanent magnets, as magnets in the rotor, rare-earth magnets that have strong magnetic force and are typified by a neodymium-system sintered magnet are utilized for the purpose of downsizing, output-boosting, and efficiency-raising of the electric rotation machine. Patent Document 1 discloses an example of electric rotating machine in which in order to increase the quantity of magnetic flux in the stator, the magnets in the rotor are arranged in a Halbach array. In the example disclosed in Patent Document 1, the magnetic poles in the rotor are configured with main magnets and auxiliary magnets; the main magnets whose magnetization direction is the radial direction and the auxiliary magnets whose magnetization direction is the circumferential direction are alternately arranged; in order to increase the quantity of magnetic flux, the relationship between the circumferential-direction width Ws of the stator-side face of an auxiliary magnet and the radial-direction thickness t of said auxiliary magnet is set in such a way that 0<Ws<1.5 t.

Patent Document 2 also discloses an electric rotating machine having a Halbach-array rotor; Patent Document 2 discloses an example in which the radial dimension of the auxiliary magnet is made shorter than that of the main magnet so that finish work is omitted and hence ease of assembly is enhanced.

PRIOR ART REFERENCE

Patent Document

[Patent Document 1] Japanese Patent Application Laid-Open No. 2007-14110

[Patent Document 2] Japanese Patent Application Laid-Open No. 2005-45984

DISCLOSURE OF THE INVENTION

Problems to be Solved by the Invention

By utilizing neodymium-system sintered magnets in a rotor, downsizing, output-boosting, and efficiency-raising of the electric rotation machine can be achieved. Moreover, in order to effectively use magnetic force, a method of arranging neodymium-system sintered magnets in a Halbach array is adopted; a typical neodymium-system sintered magnet to be used includes 27 to 28 wt % of neodymium and 1 to 5 wt % of dysprosium. Because the reserves and production areas thereof are limited in the globe, these rare-earth materials are expensive and the production quantity thereof is limited; therefore, the supply quantity thereof has become unstable. Accordingly, in the case where a large quantity of rare-earth materials is utilized in an electric rotating machine, there has been a problem that the cost of the electric rotating machine becomes expensive or the production quantity of the electric rotating machines is limited.

In the case where magnets are assembled according to the design in such a conventional Halbach-array rotor as disclosed in Patent Document 1 or 2, it is required to accurately control the finished size of the magnet shape. The finish work therefor is implemented by grinding; thus, there has been a problem, for example, that an accurate finish requires a long machining time. Moreover, the thickness of surface treatment required to prevent rust of the magnet needs to be accurately controlled; thus, there has been a problem that the manufacturing time becomes long. Furthermore, a neodymium-system sintered magnet is liable to crack; thus, there has been a problem that when magnets, formed according to the design, are assembled, contact between the magnets causes a crack or a chip.

The present invention has been implemented in order to solve the foregoing problems; the objective thereof is to provide a permanent magnet type electric rotating machine and a manufacturing method thereof that make it possible to decrease the weight of main magnets to be used, without reducing the output torque of an electric rotating machine, and to reduce the quantity of utilized neodymium-system sintered magnets, which are expensive and pose a problem of procurement. Moreover, the other objective thereof is to provide a permanent magnet type electric rotating machine and a manufacturing method thereof that make it possible to shorten the machining time for the magnet, to facilitate the assembly of the rotor, to shorten the assembly time, and to reduce a crack or a chip of the magnet when the magnets are assembled.

Means for Solving the Problems

A permanent magnet type electric rotating machine according to the present invention includes a stator including an iron core and a winding and a rotor in which magnets forming a plurality of magnetic poles are arranged on the outer-circumference surface of a rotor core; the magnetic poles of the rotor are formed of main magnets magnetized in the radial direction of the rotor and auxiliary magnets magnetized in the circumferential direction thereof, and a gap is provided between the main magnet and the auxiliary magnet.

The main magnet is formed of a neodymium-system sintered magnet, and the auxiliary magnet is formed of a ferrite magnet.

In a manufacturing method of the permanent magnet type electric rotating machine according to the present invention, the magnetic poles of the rotor are formed of main magnets magnetized in the radial direction of the rotor and auxiliary magnets magnetized in the circumferential direction thereof, and a gap is provided between the main magnet and the auxiliary magnet; the manufacturing method includes a process in which after the main magnet is mounted in the rotor core and said main magnet is magnetized, a magnetized auxiliary magnet is mounted in the rotor core.

Advantage of the Invention

The present invention makes it possible to reduce the weight of utilized main magnets without decreasing the output torque of an electric rotating machine; therefore, a permanent magnet type electric rotating machine and a manufacturing method thereof that make it possible to reduce the quantity of utilized neodymium-system sintered magnets, which are expensive and pose a problem of procurement.

Moreover, the present invention makes it possible to ease the dimensional tolerance of a utilized magnet; therefore, it is made possible to obtain a permanent magnet type electric rotating machine and a manufacturing method thereof that make it possible to shorten the machining time for the magnet, to facilitate the assembly of the rotor, to shorten the assembly time, and to reduce a crack or a chip of the magnet when the magnets are assembled.

The foregoing and other object, features, aspects, and advantages of the present invention will become more apparent from the following detailed description of the present invention when taken in conjunction with the accompanying drawings.

BEST MODE FOR CARRYING OUT THE INVENTION

Hereinafter, embodiments of the present invention will be explained with reference to the drawings. In each of the drawings, the same reference characters denote the same or equivalent constituent elements.

Embodiment 1

Figure 1:
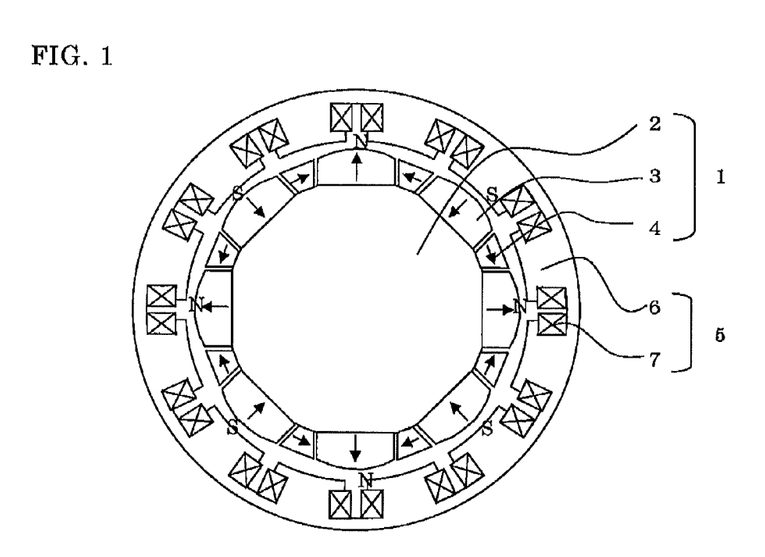
FIG. 1 is a schematic cross-sectional view illustrating the configuration of a permanent magnet type electric rotating machine according to Embodiment 1 of the present invention.
Figure 2:
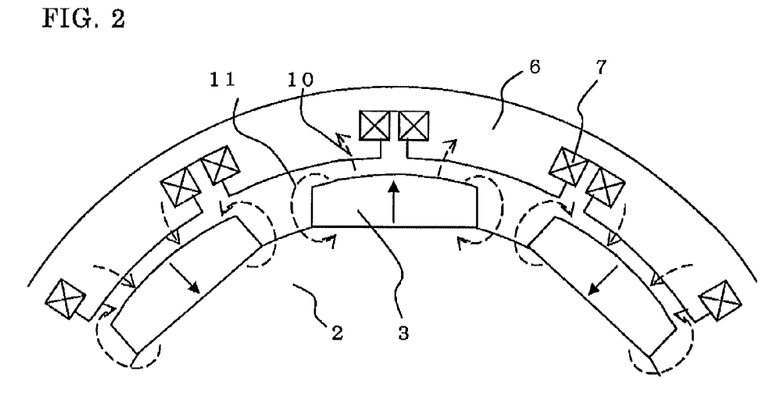
FIG. 2 is an explanatory view illustrating the flow of magnetic flux in a permanent magnet type electric rotating machine according to Embodiment 1 of the present invention.
Figure 3:
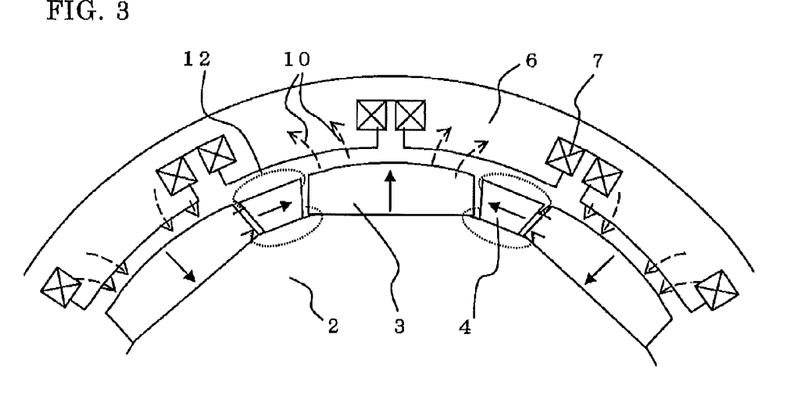
FIG. 3 is an explanatory view illustrating the flow of magnetic flux in a permanent magnet type electric rotating machine according to Embodiment 1 of the present invention.

FIG. 1 is a schematic cross-sectional view illustrating the configuration of a permanent magnet type electric rotating machine according to Embodiment 1 of the present invention; Each of FIGS. 2 and 3 is an explanatory view for the flow of magnetic flux. In FIG. 1, a rotor 1 is configured with a rotor core 2, and main magnets 3 and auxiliary magnets 4 mounted on the rotor core 2. The arrows in the magnets signify the directions of magnetization. The magnetization direction of the main magnet 3 is the radial direction; the magnetization direction of the auxiliary magnet 4 is the circumferential direction. The polarities of the main magnets 3 reverse alternately. The polarity of one end, of the auxiliary magnet 4, that faces an N-pole main magnet is N pole, and the polarity of the other end, of the auxiliary magnet 4, that faces an S-pole main magnet is S pole. The main magnet 3 is formed of a neodymium-system sintered magnet, and the auxiliary magnet 4 is formed of a ferrite magnet. The main magnet 3 and the auxiliary magnet 4 are fixed in such a manner that a gap is provided between them.

Reference numeral 5 denotes a stator configured with a stator core 6 and a stator coil 7. Due to magnetic force of the magnets, magnetic flux flows through the rotor 1, the stator 5, and the rotor 1, in that order. Rotation torque is generated by interaction between magnetic flux flowing into the stator 5 and a coil current flowing in a stator coil 7. The output torque is in proportion to the product of the quantity of the magnetic flux flowing into the stator 5 and the coil current. Under the condition that the coil current is constant, the quantity of magnetic flux can be increased by utilizing a more powerful magnet, so that the output torque can be enhanced. In contrast, under the condition that the output torque is constant, the coil current can be reduced by utilizing a more powerful magnet; thus, because the loss dissipated in the electric resistance of the stator coil 7 can be reduced, the efficiency of the electric rotating machine can be raised. Under the condition that the coil current and the output torque are constant, the magnet can be downsized by utilizing a more powerful magnet, so that the electric rotating machine can be downsized.

All the magnetic flux does not reach the stator; some of the magnetic flux flows from a given magnet in the rotor into the neighboring magnet thereof (this phenomenon occurs at an end portion, of the given magnet, that is in the vicinity of the neighboring magnet). These magnetic fluxes do not contribute to the output of the electric rotating machine. In the case where the auxiliary magnet 4 is inserted between the main magnets 3, magnetic force is generated in a direction along which the return magnetic flux is hindered; thus, because the magnetic flux departing from an end portion of the main magnet does not return to the rotor core 2 but reaches the stator 5, the quantity of magnetic flux that flows into the stator 5 can be increased and hence the magnetic force of the main magnet 3 can effectively be utilized. In other words, there is demonstrated an effect of strengthening the magnet or an effect that even when the quantity of the main magnets is decreased, equivalent output torque can be obtained.

Next, the operation and the effect of Embodiment 1 will be explained. The auxiliary magnet 4 is required to have auxiliary magnetic force only for making the magnetic flux from the main magnet flow into the stator 5; therefore, it is not required that the auxiliary magnet 4 has magnetic force equivalent to that of the main magnet. Accordingly, in the present invention, the auxiliary magnet 4 is formed of a ferrite magnet having weaker magnetic force than the main magnet 3. As the main magnet 3, a neodymium-system sintered magnet having a residual magnetic flux density of 1.2 T or larger and a coercivity of 1600 kA/m or larger has been utilized. As the auxiliary magnet 4, a ferrite magnet having a residual magnetic flux density of 0.4 T or larger and a coercivity of 300 kA/m or larger has been utilized. A gap is provided between the main magnet 3 and the auxiliary magnet 4.

FIG. 2 is a schematic view illustrating the flow of magnetic flux at a time when only the main magnets 3 are provided; FIG. 3 is a schematic view illustrating the flow of magnetic flux at a time when the main magnets 3 and the auxiliary magnets 4 are provided. In the case where only main magnets 3 are provided, the magnetic flux indicated by a broken line 10 flows into the stator (effective magnetic flux), as illustrated in FIG. 2; however, the magnetic flux, indicated by a broken line 11, that departs from an end portion of the main magnet 3 does not reaches the stator but returns to the rotor (ineffective magnetic flux).

In the case where the main magnets 3 and the auxiliary magnets 4 are provided, due to the magnetic flux, indicated by a dotted line 12, produced by the magnetic force of the auxiliary magnet 4, the magnetic flux that departs from an end portion of the main magnet also flows into the stator, as illustrated in FIG. 3. In the case where a gap is provided between the main magnet 3 and the auxiliary magnet 4, the magnetic force of the auxiliary magnet 4 decreases in proportion to the length of the magnet, because the magnetization direction (corresponding to the magnet width in the circumferential-direction of the rotor) is shortened. However, when the magnet width is 5 mm and the gap is the same as or shorter than 0.5 mm, the magnetic force decreases only by 10% or smaller; therefore, a sufficient assisting effect of the auxiliary magnet can be obtained.

Confirmation of the effect was carried out with the following electric rotating machine. The electric rotating machine has 12 slots and 8 poles, and the outer diameter of the rotor is 40 mm. The axis-direction length of the magnet, i.e., the length of the stator is 35 mm. At first, in the case where only the main magnets 3 are provided, the main magnet is a segment magnet whose shape is semicylindric ("kamaboko-style") and whose cross section is bow-shaped. Under the assumption that the width, the height, and the chip-portion height of the magnet are 9 mm, 2.6 mm, and 1.2 mm, respectively, the torque of the electric rotating machine was obtained.

Next, in the case where the auxiliary magnets 4 are concurrently utilized, the shape of the main magnet 3 is semicylindric, and the width, the height, and the chip-portion height of the main magnet 3 are 8.6 mm, 2.3 mm, and 1.2 mm, respectively. The face abutting on the rotor core is plain and the side face is perpendicular to the bottom face. The auxiliary magnet 4 is a magnet whose cross section has a trapezoidal shape. The height and the width of the auxiliary magnet 4 are 2 mm and 5 mm, respectively. The magnet width of the auxiliary magnet 4 is determined in such a way a gap can be provided between the respective side faces of the main magnet 3 and the auxiliary magnet 4. The gap spacing is 0.3 mm. The main magnets 3 and the auxiliary magnets 4 are fixed on the rotor core 2.

The followings are the results of comparison of the respective output torque values at a time when the rotors having these shapes are utilized.
(1) Only main magnets (neodymium-system sintered magnets)—the quantity of used neodymium-system sintered magnets: 1, the output torque: 1
(2) Main magnets (neodymium-system sintered magnets)+ auxiliary magnets (ferrite magnets)—the quantity of used neodymium-system sintered magnets: 0.77, the output torque: 1
(3) Only the main magnets the same as those in (2)—the quantity of used neodymium-system sintered magnets: 0.77, the output torque: 0.971

A neodymium-system sintered magnet utilizes as the main magnet 3 and a ferrite magnet utilized as the auxiliary magnet 4 have a tolerance of, for example, ±0.1 mm. The magnets are fixed on the rotor core 2 through adhesion or the like; however, a positional error is caused when the magnets are fixed on the rotor core 2. Therefore, in the case where as the example of conventional electric rotating machine, the main magnets 3 and the auxiliary magnets 4 are alternately arranged without a gap between respective ones of them, the accuracy of machining the magnets needs to be raised and the positional accuracy of fixing the magnets needs to be enhanced. Accordingly, the time required for machining and assembly becomes long. In contrast, in the configuration according to Embodiment 1 illustrated in FIG. 1, a gap is provided between the main magnet 3 and the auxiliary magnet 4; thus, the dimensional tolerance of the magnet can be eased and hence the time for machining the magnet can be shortened. The gap spacing is 0.5 mm. Moreover, the positional accuracy required in fixing the magnets on the rotor core can be eased, and hence the time for assembly can be shortened.

As described above, the permanent magnet type electric rotating machine according to Embodiment 1 of the present invention is provided with the stator 5 configured with the iron core 6 and the winding 7 and the rotor 1 in which magnets forming a plurality of magnetic poles are arranged in a Halbach array on the outer circumferential surface of the rotor core 2; the magnetic poles of the rotor are formed of the main magnets 3 magnetized in the radial direction and the auxiliary magnets 4 magnetized in the circumferential direction, and a gap is provided between the main magnet 3 and the auxiliary magnet 4.

The main magnet 3 is formed of a rare-earth sintered magnet, and the auxiliary magnet 4 is formed of a ferrite magnet.

The permanent magnet type electric rotating machine configured as described above according to Embodiment 1 makes it possible to reduce the quantity of utilized neodymium-system sintered magnets without decreasing the output of the electric rotating machine, to stabilize the supply of the electric rotating machine, and to lower the manufacturing cost. Moreover, because the dimensional tolerance of the utilized magnet can be eased, the machining time for the magnet can be shortened and hence the assembly of the rotor is facilitated; therefore, the assembly time can be shortened.

In Embodiment 1, there has been described an example of electric rotating machine having a stator with 12 slots and a rotor with 8 poles; however, the present invention is not limited to this number of pole pairs, and another number of pole pairs can demonstrate the same effect.

Embodiment 2

Figure 4:
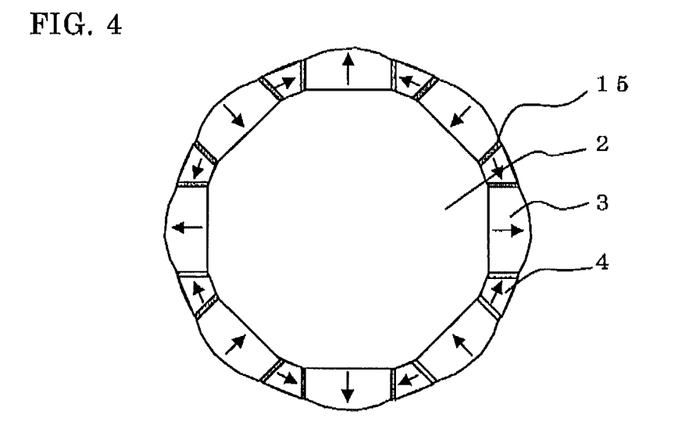
FIG. 4 is a schematic cross-sectional view illustrating the configuration of a rotor according to Embodiment 2 of the present invention.
Figure 5:
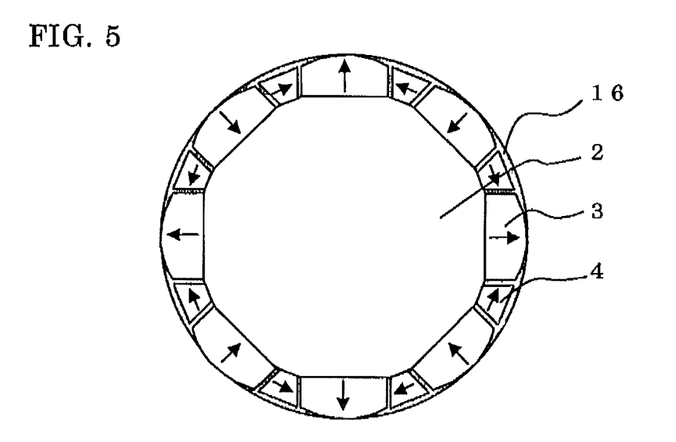
FIG. 5 is a schematic cross-sectional view illustrating the configuration of a rotor according to Embodiment 2 of the present invention.

Each of FIGS. 4 and 5 is a schematic cross-sectional view illustrating the configuration of a permanent magnet type electric rotating machine according to Embodiment 2 of the present invention. In FIG. 4, reference numeral 15 denotes a non-magnetic material disposed between the main magnet 3 and the auxiliary magnet 4. Other configurations are the same as those in Embodiment 1; thus, explanations therefor will be omitted.

When the rotor illustrated in FIG. 4 is assembled, the main magnets 3 are fixed on the rotor core 2. After a resin 15, which is a non-magnetic material, is inserted between the main magnet 3 and the auxiliary magnet 4, the auxiliary magnets 4 are adhered to and fixed on the rotor core 2. Because in the rotor configured as described above according to Embodiment 2, a resin is filled between the main magnet 3 and the auxiliary magnet 4, contact between the magnets can be prevented from causing a crack or a chip when the electric rotating machine is assembled. Moreover, fixing force exerted on the magnets against the rotor core 2 can be strengthened.

The configuration according to Embodiment 2 can also be achieved by integrally molding the rotor core 2, the main magnet 3, and the auxiliary magnet 4. In other words, it can readily be achieved by inserting the rotor core 2, the main magnet 3, and the auxiliary magnet 4 into a molding die, positioning them, and then pouring a molding resin into the molding die. FIG. 5 illustrates an example of rotor in which the main magnets 3 and the auxiliary magnets 4 are integrally molded; the rotor is manufactured through an assembly method in which after the rotor core 2, the main magnets 3, and the auxiliary magnets 4 are arranged in a molding die, a molding resin 16 is poured and fixed into the die. The integrally molded permanent magnet power generator according to Embodiment 2 can further enhance the fixing force among the rotor core 2, the main magnet 3, and the auxiliary magnet 4.

Embodiment 3

Figure 6:
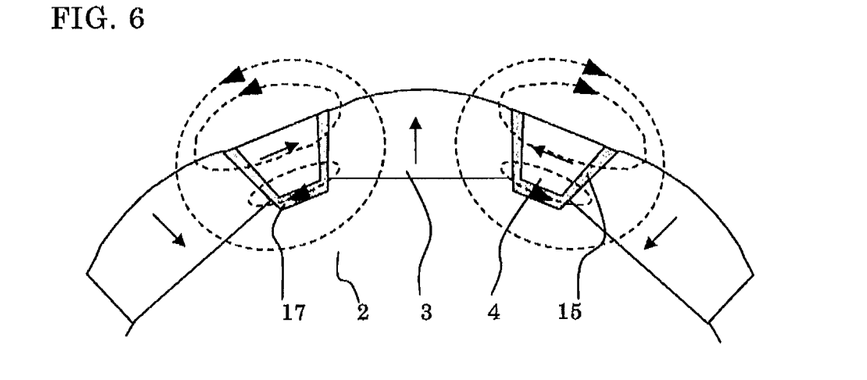
FIG. 6 is an explanatory view illustrating the configuration of a rotor according to Embodiment 3 of the present invention and the flow of magnetic flux therein.
Figure 7:
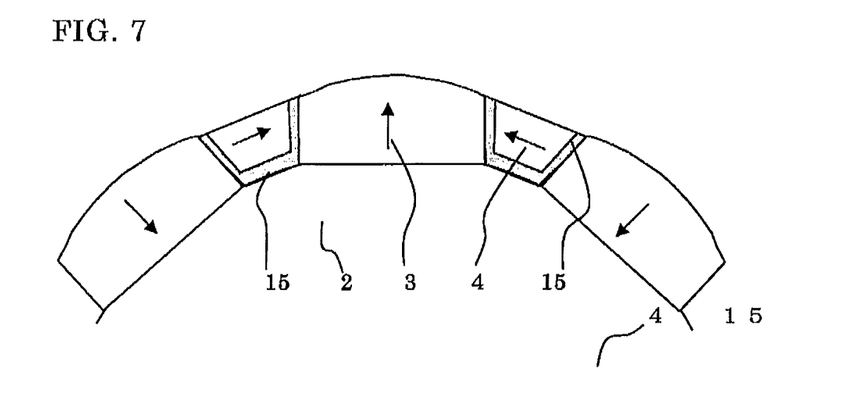
FIG. 7 is a schematic cross-sectional view illustrating the configuration of another rotor according to Embodiment 3 of the present invention.

Each of FIGS. 6 and 7 illustrates the cross-sectional configuration of the rotor of a permanent magnet type electric rotating machine according to Embodiment 3 of the present invention and the flow of magnetic flux generated by the magnets. In the permanent magnet type electric rotating machine according to Embodiment 3, a gap is provided also between the auxiliary magnet 4 and the rotor core 2; the resin 15 is filled between the main magnet 3 and the auxiliary magnet 4 and between the auxiliary magnet 4 and the rotor core 3.

As indicated by broken lines in FIG. 6, the magnetic flux of the auxiliary magnet 4 flows in a rotor outer-circumferential path and in a rotor inner-circumferential path. The outer-circumferential path works in such a way as to strengthen the magnetic flux of the main magnet 3; however, the inner-circumferential path works in such a way as to cause a loss. The non-magnetic gap provided in the inner-circumferential path makes it possible to increase the magnetic-path resistance in the inner-circumferential path; thus, the quantity of the magnetic flux in the inner-circumferential path is decreased and hence the quantity of the magnetic flux in the outer-circumferential path can be increased. In the configuration illustrated in FIG. 6, a recess 17 is provided in a portion, of the rotor core 2, at which the auxiliary magnet 4 is fixed on the rotor core 2; FIG. 7 illustrates an example where no recess is formed.

An effect can be obtained as long as the distance between the auxiliary magnet 4 and the rotor core 2 is smaller than the distance between the auxiliary magnet 4 and the stator core 6. In the case where in the foregoing electric rotating machine having 12 slots and 8 poles, a gap of 5 mm was provided between the auxiliary magnet 4 and the rotor core 2, the output torque increased by approximately 1%. The auxiliary magnet 4 is situated at an inter-pole position of the rotor and functions as the path for magnetic force generated by the stator coil 7. Accordingly, when the distance between the auxiliary magnet 4 and the rotor core 2 is too large, the magnetic resistance against the magnetic force generated by the stator coil 7 increases and hence the output is lowered.

Figure 8:
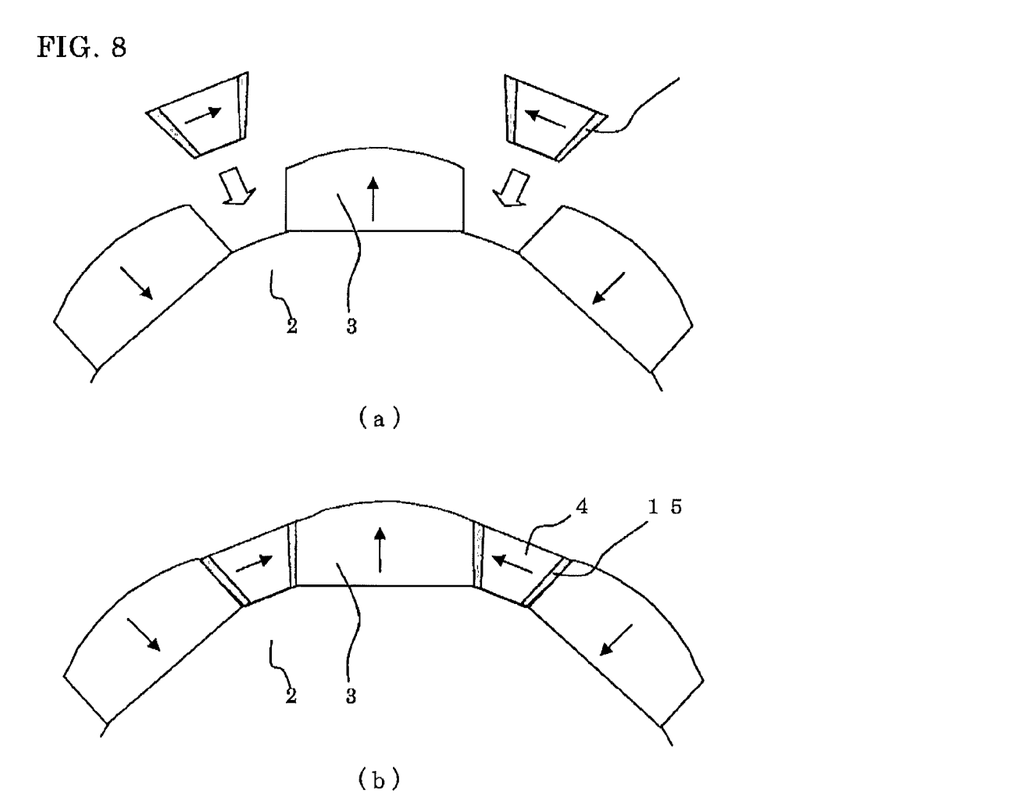
FIG. 8 is an explanatory view illustrating an assembly procedure for a rotor according to Embodiment 3 of the present invention.
Figure 9:
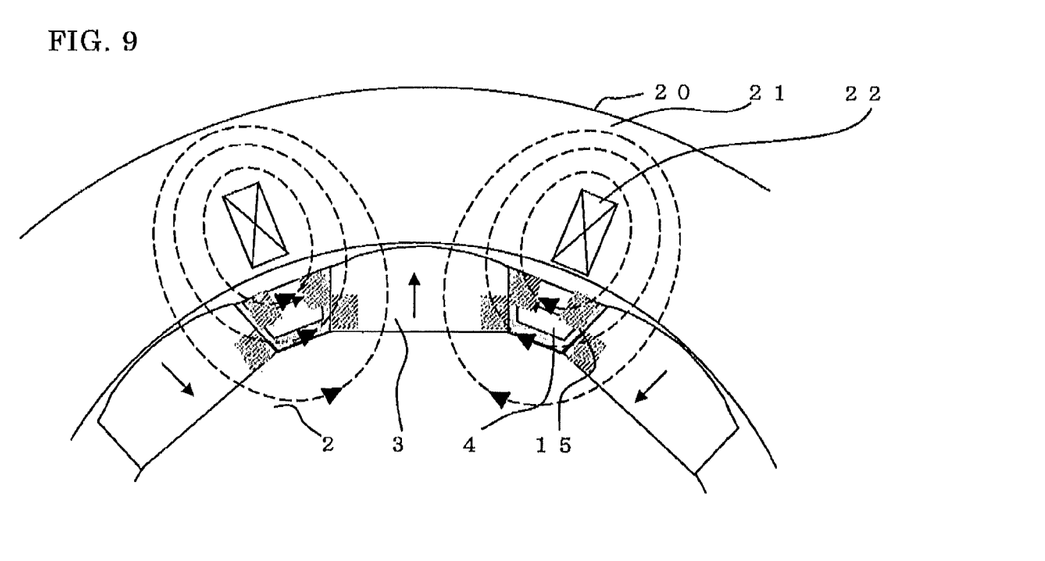
FIG. 9 is an explanatory view illustrating the status of magnetization at a time when after main magnets and auxiliary magnets are fixed, a rotor magnet is magnetized.

Next, an assembly procedure and a magnetization method for the foregoing rotor according to Embodiment 3 will be explained with reference to FIGS. 8 through 10. FIG. 8 is a view illustrating an assembly procedure for the rotor. At first, the main magnets 3 are fixed on the rotor core 2 (refer to FIG. 8(a)). As described later, in this situation, the rotor is inserted into a magnetization yoke so that the main magnet 3 is magnetized. The resin 15, preliminarily molded, is fixed to the auxiliary magnet 15; then, the auxiliary magnet is solely magnetized by use of an air-core coil or the like. After that, the auxiliary magnet is inserted and fixed between the main magnets (refer to FIG. 8(b)). The auxiliary magnet is fixed by use of an adhesive or the like. When the auxiliary magnet 4, preliminarily magnetized, is inserted between the main magnets 3, repulsive force and attractive force are produced between the auxiliary magnet 4 and the main magnet 3; however, the resin works as a buffer material, so that a crack or a chip is prevented from being caused.

Here, magnetization of the main magnet 3 will be explained with reference to the schematic views in FIGS. 9 and 10. In the case where after the main magnets 3 and the auxiliary magnets 4 are fixed on the rotor core 2, magnetization is implemented by use of a magnetization yoke, sufficient magnetization magnetic-field strength cannot be obtained at the magnet end of the main magnet 3 and the end of the auxiliary magnet 4 and hence complete magnetization is difficult. FIG. 9 is a schematic view at a time when after the main magnets 3 and the auxiliary magnets 4 are fixed on the rotor core 2, magnetization is implemented by use of a magnetization yoke. In FIG. 9, reference numerals 20, 21, and 22 denote a magnetization yoke, a core, and a coil, respectively. A pulse current of approximately 10 kA instantaneously flows in the coil 22 of the magnetization yoke 20, and magnetic flux indicated by broken lines is generated. Because only the components, of this magnetic flux, that are in the oriented direction (the same as the magnetization direction) of each magnet contribute to magnetization, the magnetic-field components that contribute to magnetization decrease in the hatched regions. Therefore, it is required to apply a larger magnetization current. Moreover, in manufacturing, there is posed a problem that the lifetime of the magnetization yoke is short.

Figure 10:
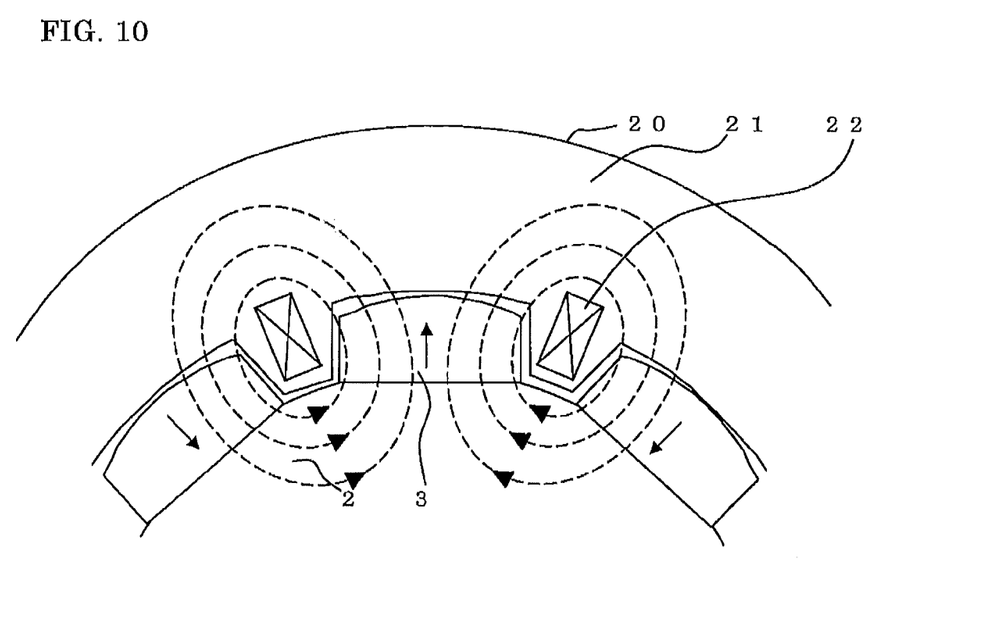
FIG. 10 is an explanatory view illustrating the status of magnetization of a rotor magnet according to the present invention.

In contrast, as the schematic view in FIG. 10 illustrates, after only the main magnet 3 is fixed, the coil 22 of the magnetization yoke 20 is disposed at a position illustrated in FIG. 10 so as to magnetize the main magnet 3, and the auxiliary magnet 4 is solely magnetized by use of an air-core coil or the like; as a result, the main magnet and the auxiliary magnet can readily and completely magnetized.

As described above, in the permanent magnet type electric rotating machine and the manufacturing method thereof according to Embodiment 3 of the present invention, in addition to the effect of Embodiment 1, the main magnet and the auxiliary magnet can readily and completely magnetized; therefore, the output of the electric rotating machine can further be raised and the efficiency thereof can be enhanced. Moreover, the magnetization can be implemented with a smaller current; thus, there is demonstrated an effect that the lifetime of the magnetization yoke can be prolonged.

Embodiment 4

Figure 11:
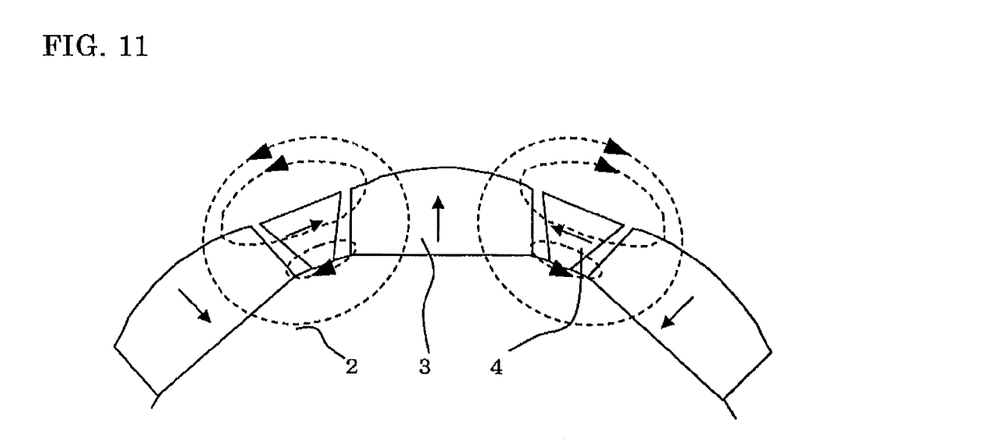
FIG. 11 is a schematic cross-sectional view illustrating the configuration of a rotor according to Embodiment 4 of the present invention.

FIG. 11 illustrates the cross-sectional configuration of a permanent magnet type electric rotating machine according to Embodiment 4 of the present invention. In Embodiment 4, the gap between the main magnet 3 and the auxiliary magnet 4 is wider at the outer-circumferential side of the rotor than at the inner-circumferential side thereof. Other configurations are the same as those in Embodiment 1; thus, explanations therefor will be omitted.

As indicated by broken lines in FIG. 11, the magnetic flux of the auxiliary magnet flows in a rotor outer-circumferential path and in a rotor inner-circumferential path. The outer-circumferential path works in such a way as to strengthen the magnetic flux of the main magnet; however, the inner-circumferential path works in such a way as to cause a loss. In Embodiment 4, by providing a non-magnetic gap for the magnetic flux at the inner-circumferential side, the magnetic-path resistance at the inner-circumferential side can be increased, and the magnet flux at the outer-circumferential side works in such a way as to increase the magnetic flux of the main magnet; therefore, by expanding the magnet width at the outer-circumferential side, the quantity of magnetic flux of the main magnet can be increased. The gap at the outer-circumferential side and the gap at the inner-circumferential side were set to 0.3 mm and 0.7 mm, respectively, so that the output torque was raised by approximately 1%.

INDUSTRIAL APPLICABILITY

The present invention is optimally applied to a permanent magnet type electric rotating machine such as a permanent magnet type synchronous motor.

DESCRIPTION OF REFERENCE NUMERALS

1: rotor
2: rotor core
3: main magnet
4: auxiliary magnet
5: stator
6: stator core
7: stator coil
10, 11, 12: magnetic flux
15: resin (non-magnetic layer)
16: molding resin
17: recess
20: magnetization yoke
21: core
22: coil

The invention claimed is:

1. A permanent magnet type electric rotating machine comprising:
a stator including an iron core and a winding; and
a rotor in which magnets forming a plurality of magnetic poles are arranged on the outer-circumference surface of a rotor core, wherein the magnetic poles of the rotor are formed of main magnets magnetized in the radial direction of the rotor and auxiliary magnets magnetized in the circumferential direction thereof and whose magnetic forces are weaker than those of the main magnets, each of the auxiliary magnets having a trapezoidal shape, wherein a radially-most outer side of the auxiliary magnets is longer than a radially-most inner side of the auxiliary magnets, and a gap is provided between the main magnet and the auxiliary magnet wherein the gap between the main magnet and the auxiliary magnet is narrower at the outer-circumferential side of the rotor than at the inner-circumferential side thereof.

2. The permanent magnet type electric rotating machine according to claim 1, wherein a resin is filled into the gap between the main magnet and the auxiliary magnet.

3. The permanent magnet type electric rotating machine according to claim 2, wherein a non-magnetic layer is provided between the auxiliary magnet and the rotor core.

4. The permanent magnet type electric rotating machine according to claim 1, wherein the main magnet is formed of a rare-earth sintered magnet, and the auxiliary magnet is formed of a ferrite magnet.

5. A manufacturing method of the permanent magnet type electric rotating machine according to claim 1, including mounting one of the magnetized auxiliary magnets in the rotor core after one of the main magnets is mounted in the rotor core and said one main magnet is magnetized.

6. The permanent magnet type electric rotating machine according to claim 1, wherein all sides of the auxiliary magnets are linear.

7. The permanent magnet type electric rotating machine according to claim 1, wherein a radially-most outer side of the main magnets is bow-shaped.

8. The permanent magnet type electric rotating machine according to claim 1, wherein a shape of the main magnets is different than the trapezoidal shape of the auxiliary magnets.

9. The permanent magnet type electric rotating machine according to claim 1, wherein a radial thickness of the main magnets is greater than a radial thickness of the auxiliary magnets.

* * * * *